United States Patent [19]

Johnson

[11] 4,165,133
[45] Aug. 21, 1979

[54] MATERIAL HANDLING SYSTEM FOR WIDE RANGE OF MATERIALS AND FLOW RATES

[76] Inventor: Albert O. Johnson, Rte. 8, Box 1052, Livingston, Tex. 77351

[21] Appl. No.: 836,895

[22] Filed: Sep. 26, 1977

[51] Int. Cl.$^2$ .................. B65G 53/28; B65G 53/36
[52] U.S. Cl. .......................... 406/109; 193/2 R; 406/131
[58] Field of Search .............. 302/21, 23, 35, 36, 302/42, 57; 222/460, 461, 462, 547, 564; 214/17 R, 17 D; 193/2 R; 198/616

[56] References Cited

U.S. PATENT DOCUMENTS

| | | | |
|---|---|---|---|
| 2,715,461 | 8/1955 | Maulsby | 302/36 X |
| 2,946,626 | 7/1960 | Atkinson et al. | 302/23 |
| 2,946,627 | 7/1960 | Polzinetti | 302/23 |
| 3,071,297 | 1/1963 | Lee | 222/462 |
| 3,369,716 | 2/1968 | Hulbert | 222/564 X |
| 3,728,759 | 4/1973 | Hergeth | 302/42 X |
| 3,797,707 | 3/1974 | Jenike et al. | 222/462 X |

FOREIGN PATENT DOCUMENTS 2461539 7/1976 Fed. Rep. of Germany .............. 302/57

Primary Examiner—Robert B. Reeves
Assistant Examiner—James L. Rowland
Attorney, Agent, or Firm—Laurence R. Brown

[57] ABSTRACT

Continuous flow at various material flow rates through a pneumatic transport system of a wide variety of granular and hygroscopic materials over a wide range of moistures, sizes and weights is achieved by gravity feed through a dispensing hopper having a portion of the side wall surface shaped as an irregular hyperbola. Thus, shipboard mounted or other portable transport system may be used to load or unload ship holds with grain, cement, seed, sand, sugar and other such materials at high flow rates through input and output hoses conveying materials from one location to another. The same system may be used at lower material flow rates achieved by lower density of materials in the pneumatic stream, thereby to sandblast and paint the ship hulls for example. Special flow rates may be chosen to adapt to given material characteristics or transport needs. Separation of input and output air transport paths is achieved by a centripetal air flow chamber filling the dispensing hopper with a store of the materials from which they continuously flow into a pneumatic conveyor tubing at controllable rates.

10 Claims, 6 Drawing Figures

MATERIAL HANDLING SYSTEM FOR WIDE RANGE OF MATERIALS AND FLOW RATES

This invention relates to pneumatic cleaning and bulk transport systems for hygroscopic and granular materials, and more particularly to improvements of such systems as shown for example in C. E. Hulbert, Jr., U.S. Pat. Nos. 3,369,716, Feb. 20, 1968 for Hopper Means Having Hyperbolic Side Walls; 3,498,003, Mar. 3, 1970 for Product Transfer Vessel; and 3,581,441, June 1, 1971 for Surface Treatment Apparatus.

BACKGROUND OF THE INVENTION

It has been proposed to clean and convey granular and hygroscopic materials pneumatically for such purposes as sandblasting and bulk material loading. In this respect it was found that a hopper feed bin required a portion of its side wall to have an irregular hyperbolic surface to prevent bridging, packing, clinging and ratholing of finely divided dry materials such as limestone and particularly hygroscopic materials such as salt or sugar, and it is acknowledged that for special purposes such as sandblasting with given materials at known flow rates these systems work well. However, their versatility has been considerably limited and such prior art systems are confined to use for chronic special purpose jobs of limited scope for which they are specially designed in terms of material flow rates, material variety and pneumatic characteristics, thereby significantly limiting the number of applications for a given system. Such special purpose prior art systems include those shown by way of example in U.S. Pat. Nos. 2,827,333, Mar. 18, 1958, S. W. Wallin; 2,446,968, Aug. 10, 1948, G. E. Toner; and 3,876,260, Apr. 8, 1975, R. A. Moss et al.

For example, a system designed for sandblasting on a continuous basis with flow of sand at about 6 tons per hour is not effective in the bulk transport of sugar at 200 tons per hour.

Various problems thus present themselves in achieving a wider range of flow and material capabilities in such pneumatic transport systems. Some problems encountered are (1) achievement of vacuum and compressor systems that are versatile to not only radically different materials such as gypsum, salt, sand and grain, but also can operate continuously at vastly different material flow rates; (2) achievement of off-on batch feed rate capabilities such as needed for loading bags or other limited capacity receptacles; (3) storage for continuous flow of enough materials for feeding a bulk transport pneumatic conveyor line at high flow rates, while operable also for limited flow rates; (4) the ability to adapt to radically different material weights, sizes, moisture contents and other physical attributes such as hygroscopy without equipment change or radically different operating conditions; (5) the basic flow characteristics through a pneumatic conveyor system having ranges from very dense to very sparse packing densities of materials in the flow paths; and (6) efficiency in operation, longevity and maintenance characteristics of a portable transport system of universal capabilities.

OBJECTS OF THE INVENTION

It is therefore a general object of this invention to improve prior art pneumatic bulk material conveyor systems.

A more specific such object is to correct one or more of the foregoing problems and shortcomings of the prior art systems.

Another object of the invention is to provide pneumatic bulk material conveying systems of universal capabilities over a wide range of material and flow conditions.

Further objects, features and advantages of the invention will be found throughout the remainder of the description, the drawings and the claims.

BRIEF DESCRIPTION OF THE INVENTION

A pneumatic conveyor system transports from a storage hopper on demand a wide range of bulk materials including finely divided powders, granular materials of various weights and hardnesses, such as grain and sand and hygroscopic materials such as sugar and salt through conveyor tubes by pneumatic flow. Because the flow characteristics from bulk storage of various materials widely differ depending upon humidity, packing, weight and size of granules, and different output flow rates may be required for transport from storage special storage hopper requirements exist.

The teachings of U.S. Pat. No. 3,369,716 provides for design parameters of a generally funnel shaped hopper establishing a constant flow rate of different materials. This general concept is improved to increase adaptability to different flow rates for precisely metering out bulk materials, and to increase the range of material properties and quantity of stored materials that may be processed. Thus, variably selectable control means establish different flow rates while maintaining a precisely constant output flow rate. Additionally the hopper wall construction provides for bulk storage of a larger volume of materials that will flow into the pneumatic stream upon demand when a gating valve is opened.

Accordingly, the conveyor apparatus serves as versatile means for conveying a larger range of materials at different flow rates. This particularly adapts the system for portable use in loading various bulk materials on ships, barges, railroad cars and the like.

A particularly advantageous system is a shipboard installation providing on-board loading-unloading equipment as well as an effective sandblast cleaning capability without modification.

Efficient pneumatic transport into and out of the storage hopper is attained by an energy saving maintenance free pneumatic system that permits either batch or continuous operating modes at given pneumatic flow pressures with such consistent material flow characteristics that the system is self-metering.

THE DRAWING

A more detailed description of the invention and its various preferred embodiments follows with reference to the accompanying drawings, having like reference characters relating the various views for ready comparison, wherein.

DETAILED DESCRIPTION OF THE INVENTION

Figure 1:
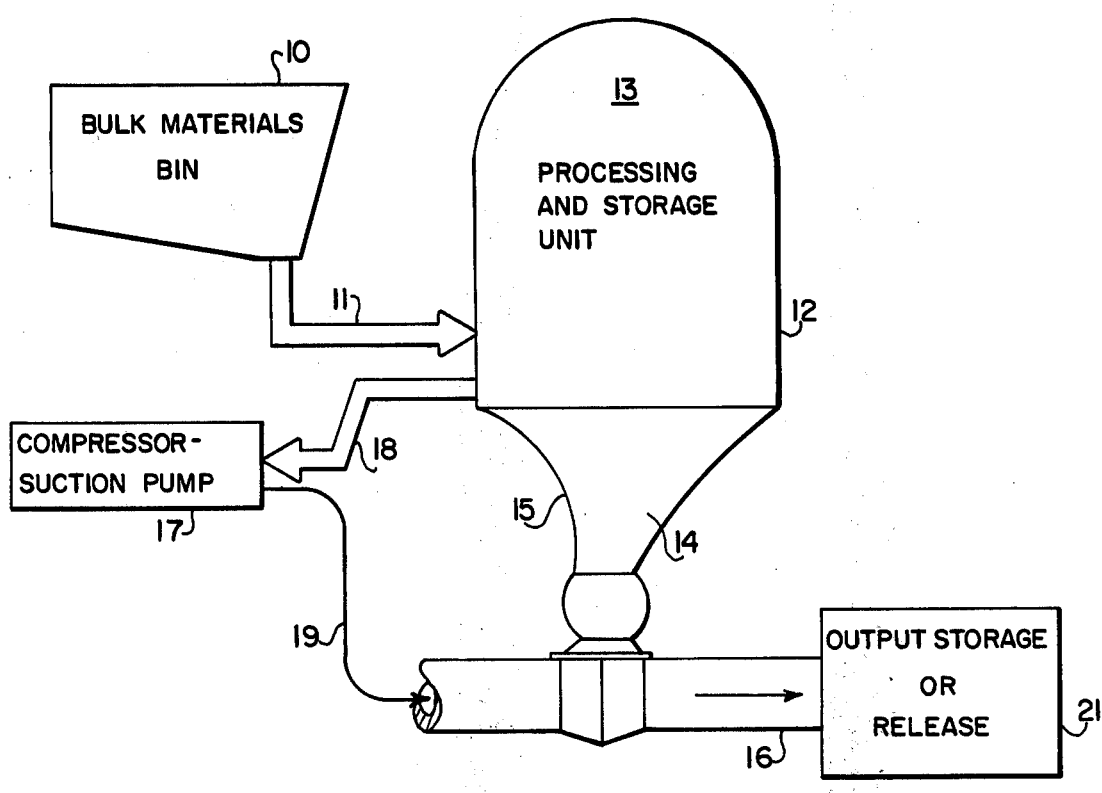
FIG. 1 is a schematic system diagram of the pneumatic conveying apparatus embodying the invention.

As seen in FIG. 1, the system arrangement of this invention is of the general type shown in the aforementioned Hulbert patents, wherein bulk materials are transported from a bin 10 pneumatically through a tubing 11 into a processing and storage unit 12 arranged in a housing array 13 which includes a lowermost storage hopper having an outlet throat portion 14 with an irregular hyperbolic surface 15 that permits materials to flow into an outlet pneumatic transport tube 16 for pneumatic conveyance therethrough to output means 21 by means of pneumatic flow in tube 19 derived from the compression outlet of a pneumatic flow source, namely compressor-suction pump unit 17. Suction via tubing 18 as drawn by the unit 17 suction inlet into housing 13 by tubing 11 serves to draw materials from bin 10 into the storage unit 12, and if desired through a cleaning or processing stage before reaching the storage hopper which terminates in throat 14. General operational aspects of the system and the particular design of the special surface 15 in the hopper are well known and are set forth in detail in the referenced patents, so that repetition is unnecessary herein. Those improvements provided by this invention will become apparent from the following description, which sets forth in detail those features provided by this invention.

Heretofore these systems have not been versatile enough in operation to adapt to various kinds of special use without extensive modification or special engineering adoption for example, to handle different bulk material flow rates and drastically different kinds of material characteristics such as weight, granularity, abrasiveness, sensitivity to moisture or damage, etc. For use in sandblasting or cleaning operations therefore the bulk material flow rate of sand would typically be six tons per hour, whereas loading of sand or grain in a barge would require handling more than 200 tons per hour. This range leads to such drastic flow difference in the prior art system that the Hulbert hyperbolic storage hopper arrays would be inoperable to provide the unimpeded continuous gravity flow characteristic into the pneumatic conveyor tube over such a drastic change of flow rates, particularly in view of the necessity to store in the hopper and discharge by gravity into the pneumatic tube much larger volumes of bulk materials for the higher rate of material transport.

Also, further problems unanswered by the prior art exist including (1) the requirement to process bulk materials in relatively small batches for loading trucks, bags, etc., as well as processing in the continuous flow mode, and (2) the requirement to meter output flow precisely for batch loading of designated amounts of bulk materials over a wide range of flow rates and bulk material constituencies.

Figure 2:
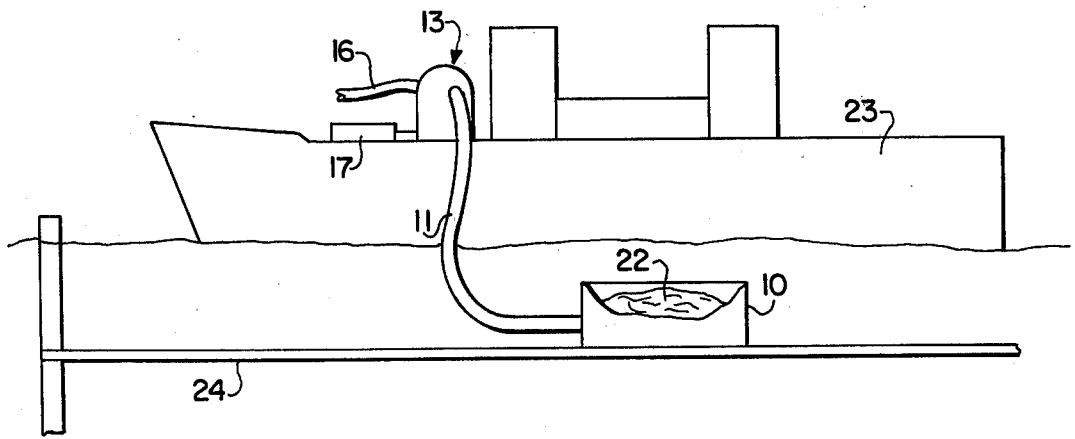
FIG. 2 is a diagram of a shipboard installation of the versatile conveying apparatus afforded by this invention providing an on-board loading-unloading-cleaning facility.

Thus, it has not heretofore been feasible to provide a multipurpose shipboard installation such as shown in FIG. 2 using a single versatile unit for loading-unloading and cleaning purposes.

As shown, the processing unit 13 by way of suction through tubing 11 will withdraw sand, grain or other bulk material 22 from the bin 10 resting on dock 24 alongside ship 23, for example. This, the storage hopper aboard ship will receive materials which can be dispensed by tubing 16 into cargo holds aboard ship, for example, under control of the pneumatic compressor 17. The tubes 11 and 16 need only be reversed for unloading bulk material cargo from holds on board the ship 23 into bins 10 or other receptacles such as trucks or railway cars.

One requirement aboard ships carrying bulk materials is cleaning out holds. Contamination from chemicals cannot be tolerated in a later load of foodstuffs such as grain or sugar, for example. Also, a load of salt would require cleanup to avoid rust problems. Thus, the same processing unit 13 can be used in a different mode at reduced flow speed with sand for sand-blast cleaning of holds (or the painted ship surfaces as well). For this purpose, no modification of the basic equipment supplied by this invention is required.

Figure 3:
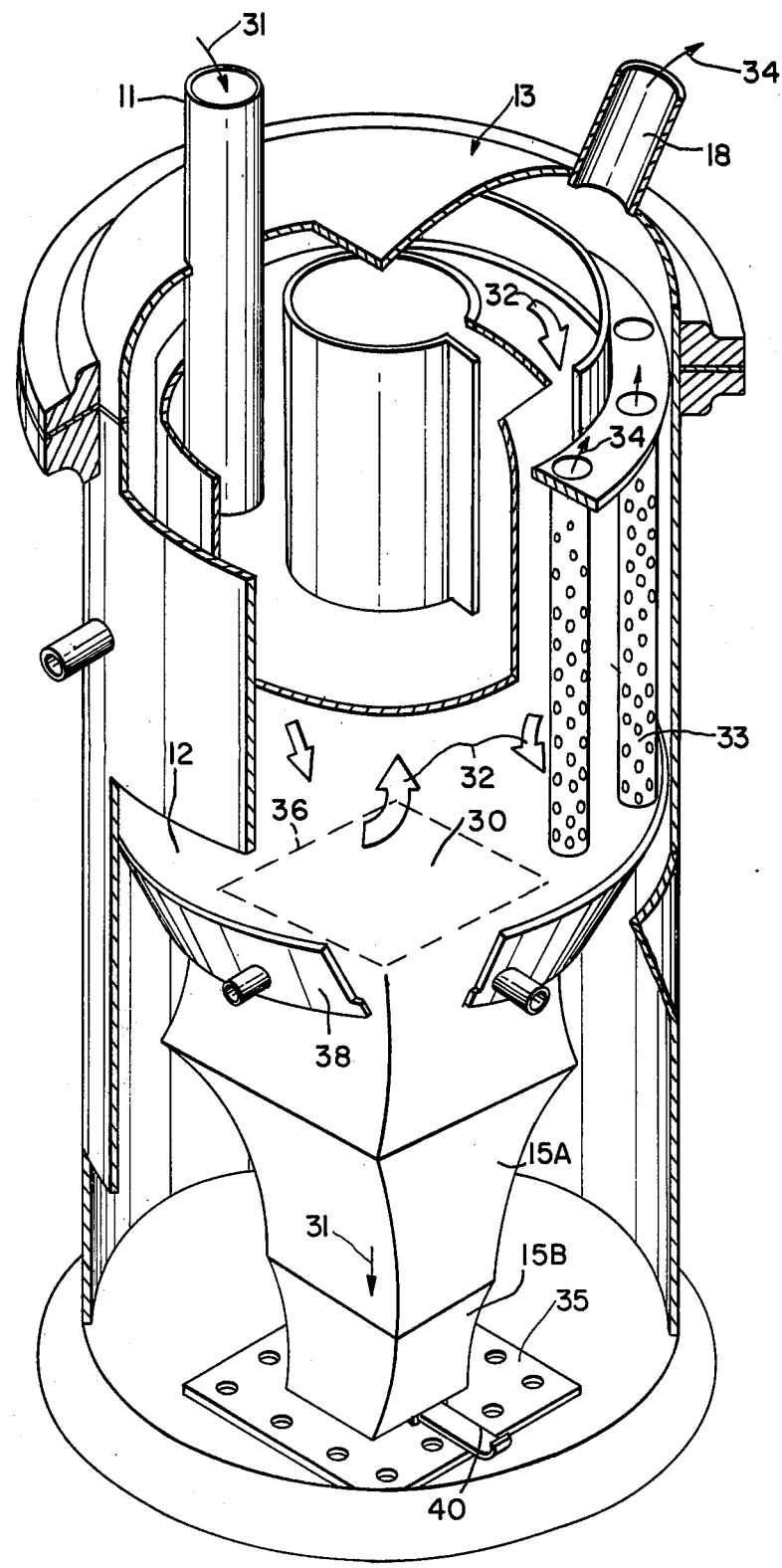
FIG. 3 is a sketch, partly broken away of a separator-storage hopper housing assembly afforded by this invention.

As shown in FIG. 3, the uppermost portion of the processing and storage unit 12 within housing 13 can be a centripetal action separator of the type described in U.S. Pat. No. 3,498,003, that will permit the conveyed bulk solids to be removed from the air path to accumulate in the lowermost storage hopper portion 30. Thus, the bulk materials coming into inlet tubing 11 as indicated by arrows 31 will proceed by force of gravity downwardly to rest in storage in the hopper portion 30 which will have an accumulation of the bulk materials stored therein. However, lighter particles, dust and air mixed together move as arrows 32 into the filter columns 33 from which clean air represented by arrows 34 proceed to the suction pump (17, FIG. 1). Thus, the bulk materials stored in the hopper 30 are free to fall therethrough by force of gravity whenever a lower gating valve (later shown) is opened.

An important and critical feature as shown in FIG. 3 is the structure of the storage hopper funnel enclosure 30. This funnel shape substantially comprises two cascaded tiers each having circumferential funnel wall portions 15A, 15B shaped to cooperate with the opposed (rear) circumferential wall portions to move bulk materials having a high angle of repose by gravity successively along the cascaded surfaces 15A and 15B in the manner taught in U.S. Pat. No. 3,369,716, so that they will reach the outlet below flange 35 adjacent the narrow throat portion 14.

Thus, the enclosure 30 is generally tapered downwardly from ridge or rim 36 defining a mouthway to the outlet opening below flange 35. Circumferential side walls 37, etc. may be flat tapered panels on the opposite sides, since the irregular hyperbolic surfaces 15A, 15B cause the bulk materials having a high angle of repose to move freely by force of gravity downwardly between those surfaces and the opposed surfaces at the rear.

With the two tiers this hopper-funnel arrangement will cause substantially constant flow rates of materials at both high and low flow rates therethrough, and at the same time will store enough materials to supply a pneumatic conveyance tube therefrom at very high bulk product flow rates. In a single tier such funnel-hopper arrangement, the flow rate would either be too fast or the storage area too deep to cause the desired irregular hyperbola feed effect without ratholing, caking, etc. in the absence of stirrers or paddles. In this arrangement the flow of the larger volume upper tier is matched into the entryway of the lower tier so that the required flow pattern prevails over substantially the entire storage depth. The inwardly tapered upper panels 38 confine any excess bulk materials above rim 36 so that they will flow downwardly into the hyperbolic surface bounded area of the upper tier.

Many solids are difficult to store in hoppers or bins as they will not flow out from the hopper or bin due to their high angles of repose, their caking tendencies, their bridging tendencies, their hygroscopicity, etc. The hyperbolic hopper was designed to solve this problem without the aid of external energy applied in the form of vibrators, paddles, shakers, etc.

The hyperbolic hopper is a storage unit built with dissimilarly shaped walls. The unique shape of these walls gives a varying angle of repose to solids stored therein. The particles of solids are constantly seeking a point of rest, but the shape of the walls presents an imbalance of weight due to progressive changes in the downward slopes of the four sides of the hopper. This weight imbalance then moves the material out of the bottom of the hopper.

Some of the many materials capable of being stored in the hyperbolic hopper and then easily removed by gravity are:
1. Sodium Chloride
2. Ammonium sulfate
3. Ammonium phosphate
4. Sugar
5. Powdered milk and eggs
6. Food mixes
7. Clay
8. Alumina
9. Bentonite
10. Alfalfa Meal
11. Calcium Carbonate
12. Carbon
13. Catalysts
14. Cement
15. Drugs
16. Feeds
17. Gypsum
18. Nitrates
19. Sands
20. Soda Ash
21. Sodium Carbonate
22. Starch
23. Sugar
24. Talc Note that these materials may come in different grain sizes and specific gravities. However, with the tiered construction of the hyperbolic surfaces, there is produced a storage hopper that will permit flow over a large range of material characteristics and flow speeds without replacement of the funnel arrangement.

To produce a capability of selecting different flow speeds through the hyperbolic hopper without disturbing the constant flow speed and the hyperbolic surface action a shutter control 40 is provided for moving into the outlet opening 41 of the hopper to decrease the opening area. In this embodiment a simple slide type shutter is used, which may be detented at several stops for different materials or at designated calibrated flow rates for specified materials.

Figure 4:
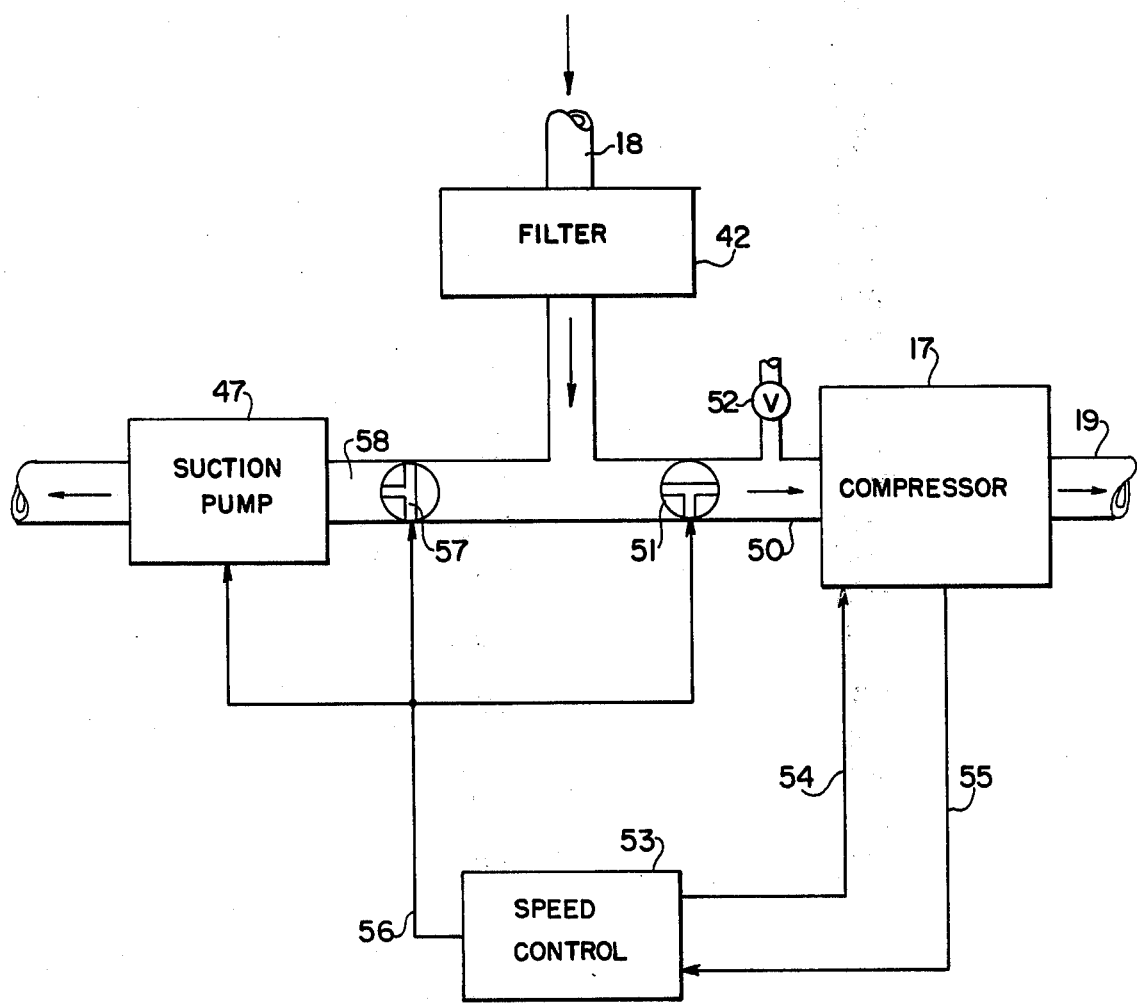
FIG. 4 is a diagrammatic view, partly in block diagram form of a pneumatic control system feature of the invention.

Since the bulk materials may be abrasive such as when sand is conveyed, the filters 33 are supplemented with a further filter 42 in the tubing line 18 to the suction source as illustrated in FIG. 4. This prevents any damage to the pumping and compressor equipment should the filters 33 in the separator housing 13 (FIG. 3) fail, since a large quantity of outlet air of necessity passes through the suction or compressor units to provide pneumatic flow for transport of bulk materials into the separator unit housing 13. This of necessity requires filter construction permitting a large flow of air and if they are of the thin fabric type, they can pass granular abrasive materials through even small pinholes. The filter 42 is therefore important to reduce maintenance and protect the pump and compressor equipment.

Also, as depicted in FIG. 4, where the air flow paths are shown by arrows, the energy requirements and weight of a system can be substantially reduced. The latter is most important for portability such as for a truck mounted unit. In this unit a typical vacuum pressure is supplied at tube 18 of 15 inches (38.1 cm) of mercury and an output pneumatic pressure is produced at tube 19 of 120 pounds per square inch (351.6 KG/cm$^2$).

In accordance with this feature, the inlet port 50 of compressor 17 is used as the suction (vacuum) pump for the input material conveyor tubing 18, when valve 51 is open as shown. The relief valve 52 permits ambient atmosphere air to be drawn in to supply the compressor, if needed.

While for most purposes the compressor 17 is run at a constant speed for conveying almost the entire gamut of materials at different flow rates, a variable speed control 53 may give more versatility under some conditions. This provides control to the compressor 17 through lead 54 and receives a feedback signal of compressor speed at lead 55.

Under routine operation for engine driven compressor units, a governor may be used to vary speed as the demand for pneumatic flow changes, and thus speed control 53 may be the conventional governor control on such a compressor.

The speed control device 53 has an output alarm lead 56 capable of operating solenoid operated valves 51, 57 and actuating the suction pump 47 when the compressor 17 pneumatic flow is deficient in supplying the necessary transport vacuum level to tubing 18. Normally valve 57 is closed, as shown, to cause the compressor 17 to derive input port 50 air from tubing 18. However, when alarm lead 56 is actuated, the suction pump 47 is activated and both valves 57 and 51 are moved so that compressor 17 draws its air through relief valve 52 and suction pump 47 draws air into inlet port 58 through valve 57 and tubing 18 thereby to supply the transport vacuum level. In this arrangement, therefore, the suction pump 47 is of low capacity and is only used when necessary because the suction capacity of compressor 17 is employed. This results in more energy use efficiency and lighter weight apparatus for portable installations.

Figure 5:
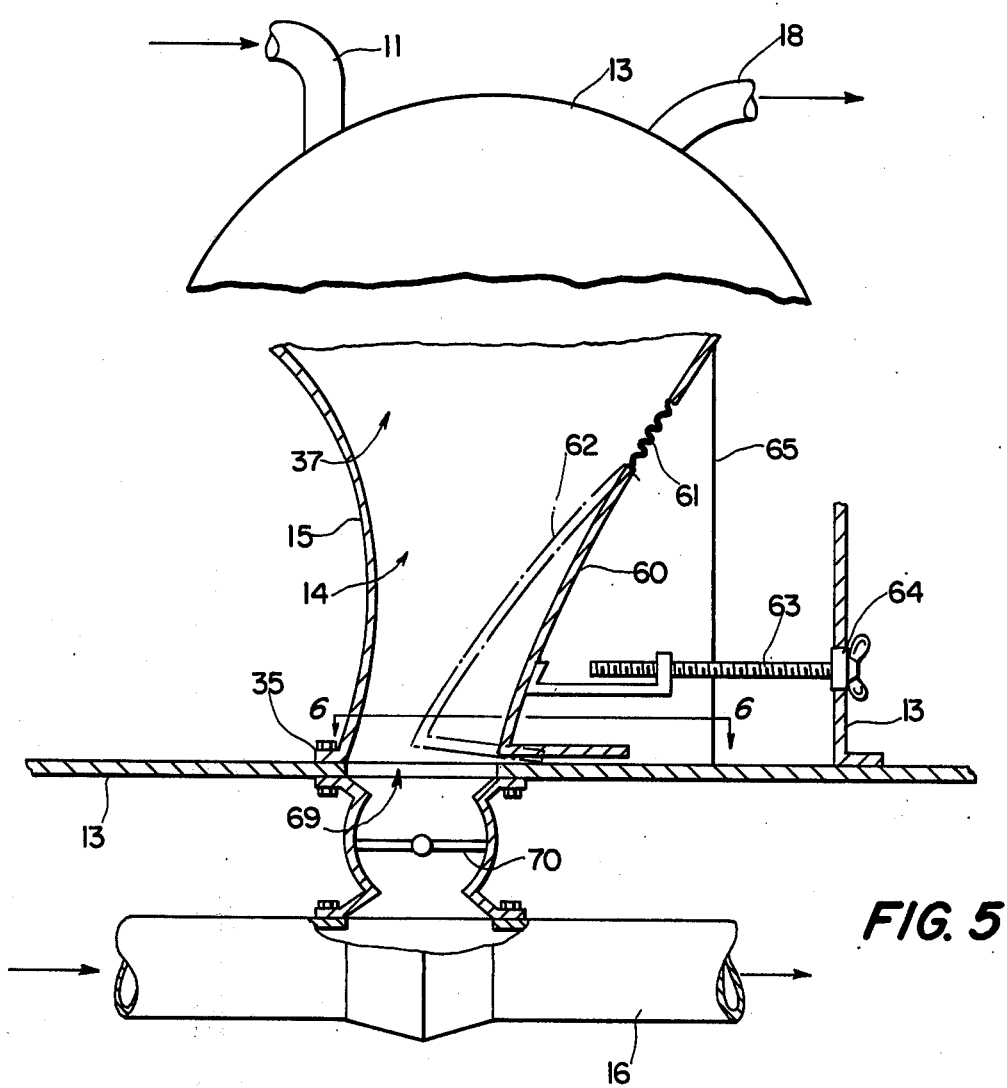
FIGS. 5 and 6 are respectively a cut-away vertical, section and horizontal section view of a storage hopper assembly embodiment of the invention.
Figure 6:
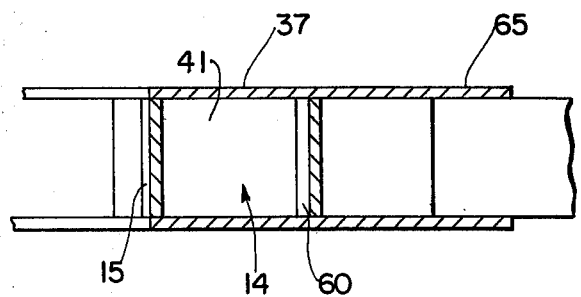

A further embodiment of the variable flow feature is illustrated in FIGS. 5 and 6. In order to supply a variable flow speed and versatility to material change characteristic to a pneumatic conveyor system of the type hereinbefore described operating with a constant pressure pneumatic conveyance flow through conveyor piping 16 the hopper throat 14 is varied by means of movable shutter 60 hinged at 61 by a plastic diaphragm for example to move in a range of positions illustrated between the phantom position 62 and that shown in section view, as adjusted by screw 63, journalled for rotation at 64 in the housing body 13. This shutter 60 arrangement slides between parallel walls 37 and adjusts the throat 14 volume without disturbing the irregular hyperbolic surface action at surface 15.

In operation therefore, the opening should be larger for conveying 200 tons of corn per hour than for conveying 200 tons of sand per hour in the transport mode. If conversion to the sandblasting mode, the throat 14 volume is reduced to produce a flow rate of the order of six tons of sand per hour. This variably selectable control shutter means 60 is located in the funnel throat 14 to establish different gravity induced flow rates out of the hopper outlet opening 69 for entry into the pneumatic conveyance tubing 16 when the gating valve 70 is opened.

Gating valve 70 permits on-off control for batching purposes, whereas shutter 60 controls the flow rate of bulk materials along line 16 with a constant pneumatic flow condition therethrough.

It is particularly important in the operation of this equipment that the flow rate be maintained constant for the various materials through the funnel throat 14 and into transport tubing 16 so that the flow of materials can be metered. This is accomplished without moving parts, scales or other weighing apparatus other than gating valve 70 which controls the batch flow time. Thus, the equipment may be used to measure out either proper batch quantities for bagging, truck loading and the like or for larger capacity ship or barge holds. This provides also a convenient method of establishing conveyance charges for use of the pneumatic transport equipment.

It is evident therefore that this invention provides more precise and more efficient improved pneumatic transport apparatus affording precise control of flow speeds over a large range of materials without substitute equipment. Accordingly, those novel features believed descriptive of the spirit and nature of the invention are defined with particularity in the appended claims.

What is claimed is:

1. A variable output pneumatic conveyor system for transporting a wide range of finely divided, granular and hygroscopic bulk materials through conveyor tubes by pneumatic flow, comprising in combination, a pneumatic source, pneumatic tubing coupled with said source to transport by pneumatic flow in the tubing said materials, material storage means accumulating and introducing primarily by force of gravity at a constant uninterrupted flow rate into said tubing for transport a continuous flow of different materials of widely differing characteristics in said range and constituting a generally funnel shaped hopper comprising a two tiered funnel having two separate hyperbolic surfaces meeting in an outwardly directed intersection with the lowermost tier having a funnel shape terminating at an output throat, establishing constant flow rate gravity feed characteristics for said different materials, variably selectable control means located in the funnel throat establishing different gravity induced flow rates out of said hopper into said tubing, and movable valve means between said hopper throat and said tubing for selectively gating upon command said flow of materials into said tubing for transport therein by means of said pneumatic source, said valve means comprising a gating valve which controls the batch flow time so that the flow of material can be metered.

2. A system as defined in claim 1 wherein said selectable control means comprises a hinged variably positionable funnel throat member pivotably movable about said hinge.

3. A variable output pneumatic conveyor system for transporting a wide range of finely divided, granular and hygroscopic bulk materials through conveyor tubes by pneumatic flow, comprising in combination, a pneumatic source, pneumatic tubing coupled with said source to transport by pneumatic flow in the tubing said materials, material storage means accumulating and introducing primarily by force of gravity at a constant uninterrupted flow rate into said tubing for transport a continuous flow of different materials of widely differing characteristics in said range and constituting a generally funnel shaped hopper having a funnel shape terminating at an output throat, establishing constant flow rate gravity feed characteristics for said different materials, variably selectable control means located in the funnel throat establishing different gravity induced flow rates out of said hopper into said tubing, and movable valve means between said hopper throat and said tubing for selectively gating upon command said flow of materials into said tubing for transport therein by means of said pneumatic source, said hopper having an upper receptacle portion with an uppermost first larger mouth and a confining vertical wall structure defining downwardly therethrough an enclosure with a first bottom smaller throat terminating in a first outlet opening for releasing by force of gravity materials entering the mouth and stored in said hopper, said enclosure having between said mouth and outlet opening wall structure comprising two cascaded tiers each having a surface with a different hyperbolic curvature between a respective second uppermost larger mouth and a respective second smaller throat terminating in a respective second outlet opening with a generally outwardly directed intersection between the two tiers joining the two hyperbolic curvatures for passage therefrom by force of gravity materials entering the respective second mouth, each of the tiers respectively inwardly tapered from said respective second mouth to define each of said respective curvatures toward said respective second throat at a circumferential portion of said respective portion of said confining wall along the length of each tier opposed to a sloping inwardly tapered respective opposing circumferential wall surface portion thereby holding between the respective opposed wall portions of said two tiers bulk materials with a high angle of repose that moves freely by force of gravity downwardly between said respective opposed surfaces from the different curvature of the uppermost tier into that of the lowermost tier toward said first outlet.

4. A system as defined in claim 3 including a housing having an upper portion containing a centripetal action material separator operable from a pneumatic suction source drawing materials thereinto, and a lower portion containing said hopper.

5. A system as defined in claim 1 including pneumatic means conveying said materials into said hopper for storage therein.

6. A system as defined in claim 5 having a compressor with respective suction input and blower output ports, pneumatic tube means coupling said suction input port to transport materials into said hopper and pneumatic tube means coupling said blower output port to transport materials out of said hopper, thereby constituting said pneumatic source.

7. A system as defined in claim 6 including an auxiliary suction device with lower pneumatic capacity than said compressor, and control means selectively connecting as the suction source for said pneumatic tube means transporting materials into said hopper only one of said compressor means suction input port and said suction device.

8. A system as defined in claim 3 including a suction source, a common housing having said hopper in a lowermost position and a suction port and a material input transport port at an uppermost position, with filter means in said housing to prevent materials from entering said suction port, and a tubing connecting said suction port to said suction source including additional filter means.

9. A generally funnel shaped storage hopper having a funnel shape establishing at a first output throat a constant flow rate gravity feed characteristic for a wide range of different materials of varying size, weight and hygroscopy, comprising in combination, an upper receptacle portion with a first uppermost larger mouth and a confining wall defining downwardly therethrough a walled enclosure with a bottom smaller throat terminating in a first output opening for releasing therethrough by force of gravity said materials entering said mouth and stored in said hopper, said enclosure having between said mouth and outlet opening two cascaded tiers each having a respective second uppermost mouth and a respective portion of said confining wall defining downwardly therethrough a respective portion of said enclosure with a respective second smaller throat terminating in a respective second outlet opening for passage therefrom by force of gravity materials entering the respective second mouth, each of the tiers respectively inwardly tapered from said respective second mouth to said respective second throat and from said respective second throat to said respective second mouth and having a circumferential portion of said respective portion of said confining wall along the length of each tier defining an irregular hyperbolic curved surface opposed to a sloping inwardly tapered respective opposing circumferential wall surface portion thereby holding between the respective opposed wall surface portions bulk materials with an angle of repose that moves freely by force of gravity downwardly between said respective opposed surfaces.

10. A hopper as defined in claim 9 further comprising throat restriction control means to selectively change the rate of flow of materials through said hopper by force of gravity, said control means comprising a hinged variably positionable throat member pivotably movable about said hinge.

\* \* \* \* \*